Patented Aug. 16, 1932

1,872,456

UNITED STATES PATENT OFFICE

WILLIAM W. KELLY, OF CLEVELAND HEIGHTS, OHIO, ASSIGNOR TO THE NUT PRODUCTS COMPANY, OF CLEVELAND, OHIO, A CORPORATION OF OHIO

PROCESS OF PREPARING AND DISTRIBUTING NUTS

No Drawing.  Application filed May 14, 1932.  Serial No. 611,439.

This invention relates to a process of preparing and distributing nuts.

The customary way of preparing and distributing nuts of the class to which this invention relates is to boil or French fry them in a deep fryer in vegetable oil such as cocoanut, cotton seed or corn oils with subsequent addition of a suitable amount of salt if desired. These nuts are then packed in suitable containers and either with or without intermediate storage are transported to the retail establishment where they are sold.

It is highly desirable that the nuts should be prepared and shipped to the place of retail in such condition that they can be readily transferred to display or storage containers for sale. It has not heretofore been possible to prepare mixed nuts and transmit them to the place of sale in mixed condition without losing much of the delicacy of flavor by reason of the blending of flavors in the container and the contamination of each nut with flavors from adjacent ones of different kind. The mixing of the flavors results in a flatness of taste which detracts from the value of the mixed nuts.

The main object of the invention is to provide a process or method of preparing and distributing nuts in which a quantity of nuts of the same or different kinds is first partially cooked and then placed in containers for shipment or storage and thereafter removed from the containers and heated or toasted until the cooking operation is complete.

Another object of my invention is to provide a method of conditioning and distributing mixed nuts which will overcome the above noted difficulties and result in delivery of a satisfactory and tasty food to the consumer.

According to the preferred form of my invention, nuts are first cooked almost but not quite completely. This slight incompleteness avoids to a considerable extent the cracking of the oil in which the cooking is carried out by rendering a somewhat lower temperature satisfactory for the purpose. The nuts may, however, be completely cooked if desired. After cooking, the nuts are mixed and packed in suitable containers for storage or shipment.

During storage or shipment, the mixing of flavors above referred to takes place. This is true whether the nuts are packed in vacuum or hermetically sealed containers, in boxes which are closed but not air-tight, or even in open containers if there is any considerable bulk. In an open receptacle containing, for example, one pound, the mixing of flavors would be small but appreciable especially if the time consumed in storage and/or shipment should amount to more than a few hours. Where boxes or receptacles containing five pounds or more of mixed nuts are allowed to stand a day or more, especially where provided with a cover such as a telescoping lid, the mixing of flavors is quite pronounced. Where air-tight or vacuum packing is employed and the elapsed time is relatively great, the mixing tendency is very great.

I have discovered that by subjecting the mixed nuts to a "slow heat" or toasting process, the mixed flavor or flatness is driven off and the individual flavor of each nut is restored. This step of the process is preferably carried out by the use of a reflector type toaster or warmer wherein the nuts are enclosed in an open-top receptacle and heated by reflected heat from above. It is to be understood that this particular toaster or warmer is not essential but that other equivalent devices may be employed. The essential feature of the second or completion toasting is that the heat should be sufficient to drive off the mixed volatile elements or flatness and slow enough to avoid cracking the oils or burning or otherwise damaging the product. This step will preferably include the addition of fresh oil, butter or similar suitable seasoning.

In the case of unmixed nuts, that is nuts of the same kind or flavor, I first partially cook the nuts in a suitable vegetable oil, such as cocoanut oil, and then place them in closed containers for shipment or storage. When the nuts are received by the retailer, who sells them to the consumer, they are removed from the containers and placed in a suitable toaster where further heat is applied while the nuts are being tumbled. This second cooking operation removes the moisture which may have been absorbed by the nuts and restores the nuts to their original flavor. It is desirable to apply to the nuts before they are sold to the consumer some suitable seasoning which is usually perishable and which contains butter and salt. It is impractical to cook the nuts in a fatty oil such as butter for the reason that it will soon become rancid but if the nuts are first cooked in a vegetable oil without perishable seasoning and the perishable seasoning is applied to the nuts just before they are sold to the consumer, they will be very fresh and palatable. It is also possible to ship the unmixed nuts in separate containers or in a single container having a plurality of compartments which are sealed and which may contain different kinds or flavors of nuts in the different compartments so that a mixing of the flavors will not occur. In such a case, the nuts could be mixed at the time of the toasting operation at which time the perishable seasoning is also added. The containers in which the nuts are shipped are preferably opaque as the vegetable oil in which the nuts are cooked spoils more quickly when exposed to light. I have found that nuts when mixed with butter will not keep longer than eight or ten days while the nuts cooked in vegetable oil and packed in sealed containers will keep from forty to sixty days if kept in a dark place.

The final toasting operation is the same whether the nuts are of the same or different kinds or flavors and its function is to drive off the volatile elements and moisture to remove the flatness. This toasting process should be slow enough to avoid cracking the oils or burning or otherwise damaging the nuts. The nuts should be tumbled continuously while being subjected to the heat. Fresh oil, butter or other suitable seasoning is applied to the nuts during the toasting operation. Another advantage of this process is that the nuts may be delivered to the consumer while warm and yet not be overcooked or burned which would be the case were the nuts completely cooked in the first operation.

It frequently occurs that, when a large quantity of unmixed nuts are shipped or stored in a single container, there will be present a few scattered ones of an inferior grade or flavor which will tend to contaminate the good ones. The toasting operation tends to overcome the ill effects of the mixing of the flavor of the inferior nuts by restoring the original flavor and freshness to the nuts of first quality and confining the interior flavor strictly to the inferior nuts.

In the specification I have used the term "sealed" containers but it is to be understood that my process is not limited to the use of hermetically sealed or completely closed containers and the embodiment of my invention herein disclosed is to be considered merely as illustrative and not in a limiting sense as various changes may be made in the details thereof without departing from the spirit of my invention, as the invention is limited only in accordance with the scope of the appended claims. This application is a continuation in part of my copending application Serial No. 547,461 for process of preparing and distributing nuts, filed June 27, 1931.

Having thus described my invention, what I claim is:

1. The process of preparing and distributing nuts which consists in packing cooked, mixed nuts in containers for shipment or storage and thereafter removing them from said containers and heating them to drive off mixed flavor and restore individual flavors to the nuts.

2. The process of preparing and distributing nuts which consists in packing cooked, mixed nuts in closed containers for shipment or storage and thereafter removing them from said containers and heating them to drive off mixed flavor and restore individual flavors to the nuts.

3. The process of preparing and distributing nuts which consists in packing cooked, mixed nuts in sealed containers for shipment or storage, and thereafter removing them from said containers and toasting them to drive off mixed flavor and restore individual flavors to the nuts.

4. The process which consists in cooking a plurality of kinds of nuts in vegetable oil, packing said nuts so treated in sealed containers, and after a time removing such nuts from said containers and toasting them for driving off mixed flavor and bringing out individual flavors.

5. The process which includes packing a plurality of kinds of partially cooked nuts in a sealed container, and after a time removing such nuts from said container and heating them for driving off mixed flavor, bringing out individual flavors, and completing the cooking.

6. A process of preparing and distributing nuts of different grade or quality which consists in cooking the same incompletely, then packing the nuts in closed containers for shipment or storage and thereafter further cooking the nuts whereby to drive off mixed flavor and to restore the original flavor.

7. The process of preparing and distributing nuts of different grade or quality which consists in cooking the nuts incompletely in a vegetable oil, packing the nuts in sealed containers for shipment or storage, thereafter tumbling the nuts and simultaneously subjecting them to a toasting operation to drive off the mixed flavor and to restore the original flavor and adding perishable seasoning.

8. The process of preparing and distributing nuts of different grade or quality which consists in applying heat to the nuts until they are nearly but incompletely cooked, then packing the nuts in closed containers for shipment or storage and thereafter tumbling the nuts and simultaneously subjecting them to a heating operation to drive off mixed flavor and to restore the original flavor and adding seasoning.

9. The process of preparing and distributing nuts of different grade or quality which consists in partially cooking the nuts in a relatively non-perishable oil, then packing the nuts in containers for shipment or storage, thereafter heating the nuts to drive off the mixed flavor and to restore the original flavor and until they are completely cooked.

In testimony whereof, I hereunto affix my signature.

WILLIAM W. KELLY.